(12) United States Patent
Kalliopuska et al.

(10) Patent No.: US 9,120,907 B2
(45) Date of Patent: Sep. 1, 2015

(54) METHOD AND RELATED ARRANGEMENT FOR DEVULCANIZATION OF VULCANIZED RUBBER

(71) Applicants: Juha Kalliopuska, Espoo (FI); Samuel Holm, Espoo (FI); Tuomas Holm, Espoo (FI)

(72) Inventors: Juha Kalliopuska, Espoo (FI); Samuel Holm, Espoo (FI); Tuomas Holm, Espoo (FI)

( * ) Notice: Subject to any disclaimer, the term of this patent is extended or adjusted under 35 U.S.C. 154(b) by 42 days.

(21) Appl. No.: 13/930,423

(22) Filed: Jun. 28, 2013

(65) Prior Publication Data

US 2015/0005400 A1    Jan. 1, 2015

(51) Int. Cl.
*C08J 11/16* (2006.01)
*B01J 19/12* (2006.01)

(52) U.S. Cl.
CPC ...... *C08J 11/16* (2013.01); *B01J 19/12* (2013.01); *B01J 2219/12* (2013.01); *C08J 2321/00* (2013.01)

(58) Field of Classification Search
CPC ............ B01J 9/08; B01J 9/12; B01J 2219/12; C08J 11/10; C08J 11/16; C08J 2321/00
USPC ................ 521/40, 40.5, 41, 42.5; 378/1, 210; 252/301.16, 301.17, 301.18, 301.33, 252/301.34, 301.35, 301.36, 301.4 R, 252/301.6 R, 582, 583, 700, 950
See application file for complete search history.

(56) References Cited

U.S. PATENT DOCUMENTS

| | | | | |
|---|---|---|---|---|
| 4,264,481 A * | 4/1981 | Markvik | ...................... | 521/44.5 |
| 5,304,576 A * | 4/1994 | Martinez | ......................... | 521/41 |
| 6,420,457 B1 * | 7/2002 | Wicks et al. | .................. | 523/300 |
| 7,767,722 B2 * | 8/2010 | Fan et al. | ......................... | 521/41 |
| 2010/0127216 A1 * | 5/2010 | Yao et al. | .................. | 252/301.35 |

* cited by examiner

*Primary Examiner* — Frances Tischler
(74) *Attorney, Agent, or Firm* — Young & Thompson (57) ABSTRACT

A method for devulcanization of rubber feedstock and a related arrangement are provided. The method includes doping rubber feedstock with a photoactive substance (104, 110), configured to activate upon exposure thereof to external radiation of a predetermined wavelength; and further exposing cured rubber feedstock to the external radiation of the predetermined wavelength. Radiation exposure results, upon photoactive substance activation, in initiation of selective scission of intermolecular crosslinks, such as sulfur crosslinks, in the vulcanized rubber elastomers. The photoactive substance may be configured to initiate an excitation emission response and/or chemical reaction. The photoactive substance is preferably selected from semiconducting nanocrystals, such as quantum dots. An arrangement for carrying out the method is presented.

15 Claims, 3 Drawing Sheets

METHOD AND RELATED ARRANGEMENT FOR DEVULCANIZATION OF VULCANIZED RUBBER

FIELD OF THE INVENTION

Generally the present invention relates to devulcanization of rubber polymers and modification occurring thereupon. In particular, however not exclusively, the present invention concerns a devulcanization method and related arrangement utilizing external radiation to initiate or at least enhance the devulcanization process.

BACKGROUND

Discovery of rubber vulcanization almost two centuries ago gave rise to a continued interest in the use and recycling of cured rubber. Vulcanization is a chemical process for improving rubber elasticity and strength by heating thereof in the presence of sulfur. Sulfur is the oldest vulcanization agent, which links rubber polymer molecules together thus forming a three-dimensional network of individual polymeric chains cross-linked by sulfur bonds or sulfur bridges. During devulcanization process aforesaid sulfur-to-sulfur bonds are broken and the rubber particles are preferably returned to its reactive state.

Enormous numbers of used tyres, conveyor belts, hosepipes and other items are discarded each year. According to some estimates, annual production of rubber items reaches massive amount of 21 million tons, which corresponds to eight billion car tyres, for instance. These used rubber products typically end up at a landfill since there is no or very little use for them after the intended life-span.

As the demand for rubber in world market is extremely high and seems to remain that way, recycling of used rubber materials should be in the interest of both industrial users and environmentalists to secure the availability of the raw material and minimize e.g. the obvious waste problems associated with the rather challenging waste management of the used rubber products, respectively.

The existing rubber reclaiming and regenerating processes do not exploit devulcanization of rubber feedstock to the extent that would make a clear difference in the demand of new raw rubber eligible for vulcanization. The reason resides in the low yield and inferior quality, complexity, and obviously high price of the available devulcanization technology. Various microwave or ultrasound based methods, temperature control or temperature change based methods, biological methods, chemical methods such as oil-based methods, mechanical methods, and different combinations of the above have previously been suggested for use in devulcanization processes without considerable success. Devulcanization of discarded, cured rubber still remains a challenging problem, largely because during vulcanization the cross-linked rubber becomes thermoset and cannot be reformed into other products.

Polymeric molecular backbone created by vulcanization comprises apart the aforesaid sulfur bridges, also carbon-sulfur and carbon-carbon bonds, with characterizing binding energies of about 271.8 KJ (440 nm), 301 KJ (397 nm) and 347 KJ (345 nm), respectively. Known devulcanization processes rely on a wellknown fact that the energies of S—S and C—S bonds in the cured rubber network are lower than that of C—C bonds; therefore the former two types of bonds can be selectively broken up by various above mentioned methods while the parallel chains of molecular backbone are not influenced. However, the above-mentioned selective breakage has turned out to be a difficult objective. Since the mentioned binding energies are relatively close to each other, a de-crosslinking process of high selectivity is required. Implementation of such processes in practice by current devulcanization techniques remains problematic.

SUMMARY OF THE INVENTION

The objective is to at least alleviate the problem described hereinabove and to provide an industrially feasible alternative for devulcanization of vulcanized rubber feedstock.

The objective is achieved by different embodiments of the present invention. In one aspect, a method for devulcanization of cured elastomers, especially vulcanized rubber material, such as discarded or 'waste' rubber, is provided. In another aspect, an arrangement for the same is provided.

Indeed, a method for devulcanization of vulcanized rubber feedstock comprises
- obtaining vulcanized rubber feedstock provided with at least one predetermined photoactive substance, the substance being configured, in response to exposure thereof to external radiation of predetermined first wavelength, to initiate selective scission of intermolecular crosslinks, at least sulfur crosslinks, in the vulcanized rubber elastomers within the effective range thereof;
- exposing vulcanized rubber feedstock provided with at least one said photoactive substance to external, substantially rubber-penetrating, radiation of said first wavelength so as to initiate in said at least one photoactive substance a response reaction of selective scission of intermolecular cross-links, such as the sulfur crosslinks, in the vulcanized rubber elastomers.

Optionally, the at least one predetermined photoactive substance is configured to additionally initiate scission of carbon-sulfur bonds.

In an embodiment, at least one photoactive substance is configured to initiate response reaction upon being subjected to x-ray exposure. The external rubber-penetrating radiation may thus be or at least comprise X-radiation. Alternatively or additionally, further type of radiation may be exploited depending on the embodiment and especially the sensitivity of the used photoactive substances to different wavelengths.

In one other, either supplementary or alternative, embodiment, the at least one photoactive substance is configured to mediate radiation excitation induced emission process(es) resulting in selective breakdown of intermolecular crosslinks, such as at least sulfur crosslinks, in the vulcanized rubber elastomers.

The at least one photoactive substance may comprise a scintillator or generally luminescent substance configured to emit, in response to the incident radiation, radiation of a second wavelength (emission radiation). Preferably, said luminescent substance is configured to emit radiation the wavelength of which falls within the range of 390-450 nm, being e.g. about 390, 400, 420 or 440 nm. Wavelength range for the emission radiation is adjusted such, to dissociate sulfur crosslinks in cured elastomers.

In some embodiments, the luminescent substance comprises photoluminescent substance. In some embodiments, the luminescent substance may in particular comprise fluorescent substance.

In some embodiments, the luminescent substance is provided in the form of scintillation nanocrystals. In one embodiment the luminescent substance is provided in the form of luminescent inorganic nanocrystals, such as quantum dots (Q-dots or QDs). Preferably, non-toxic (prior to, upon and/or after use) quantum dots are utilized.

In a further, either supplementary or alternative, embodiment the dimensions (size), shape, and/or composition of scintillation nanocrystals utilized are selected and/or adjusted so as to enable emission at anticipated wavelength(s) for selective scission of desired bond(s) and/or for the activation of (photo)chemical substance(s) to fulfill same purpose.

In a further, either supplementary or alternative, embodiment the at least one photoactive substance comprises (photo) chemical substance configured to mediate radiation induced chemical process(es) resulting in selective breakdown of intermolecular crosslinks, such as sulfur crosslinks, in the vulcanized rubber elastomers. Such photoactive substance may be configured to generate, or alternatively, to be transformed to an intermolecular crosslinks dissociating chemical agent upon subjection to radiation exposure. In some embodiments said chemical agent may be an acid, a base or a derivative thereof. Further, the at least one photoactive substance may also comprise luminescent substance as described hereinbefore.

In a further embodiment, the at least one photoactive substance comprises two photoactive substances, wherein the first one comprises luminescent substance responsive to the external radiation of first wavelength and emissive of radiation of third wavelength, and the second one comprises (photo)chemical substance responsive to the radiation of third wavelength emitted by the luminescent substance. The first substance may be thus configured to mediate radiation excitation induced emission process(es) and the second one, in turn, is configured to mediate radiation induced chemical process(es), wherein both processes result in selective breakdown of intermolecular crosslinks, such as sulfur crosslinks, in the vulcanized rubber elastomers.

Generally, the external radiation of the first predetermined wavelength may be utilized to both directly and indirectly initiate the response reaction for selective scission of at least sulfur crosslinks in at least one photoactive substance. Besides directly inducing emission excitation processes in the first photoactive substance, the external radiation of the first predetermined wavelength(s) may be indirectly utilized to initiate photochemical sulfur crosslinks scission response in the second photoactive substance. Activation of the second photoactive substance thus occurs upon capturing the photons emitted as a result of an excitation of the first photoactive substance and triggers chemical processes, as disclosed above. In some embodiments, the second photoactive substance may be directly responsive to the radiation of first wavelength in addition to the radiation of third wavelength. Since the sensitivity of the first and the second photoactive substances to the first wavelength may vary, the choice of external radiation wavelength may be adjusted respectively.

In further embodiments, a number of accessory agents, such as hydrogen producers, catalysts, modifier and/or reducing agents are utilized in order to activate, facilitate or enhance the devulcanization. For instance, devulcanization can be carried out in hydrogen atmosphere.

In some embodiments, the method may include pre-processing of vulcanized rubber feedstock for increasing total surface area thereof, for instance. Pre-processing preferably comprises downsizing the items made of said vulcanized rubber by subjecting those to mechanical stress prior to or upon radiation exposure by cutting, slicing, shredding, grounding and the like. For instance, vulcanized rubber items may be shred into slices, strips or crumbs, and/or put under tension to facilitate devulcanization and/or e.g. photoactive substances' positioning relative to the bonds to be broken.

In a further, either supplementary or alternative, embodiment the vulcanized rubber feedstock is heated up prior to or during the devulcanization process. Temperature of cured (vulcanized) rubber may be elevated up to about 150-180 degrees Celsius, preferably up to about 160 or 170 degrees Celsius, to facilitate devulcanization. In some embodiments, even higher temperatures could be applied. Alternatively or additionally, elevated processing pressure could be utilized, which may vary considerably depending on the embodiment. For example, the pressure of few tens of bars or hundreds of bars could be applicable. The process gas could include e.g. hydrogen and/or some applicable gas mixture.

In another aspect, an arrangement for vulcanized rubber devulcanization in accordance with the aforesaid method is provided, the arrangement comprising:

optional pre-processing means for the cured rubber feedstock;

an irradiation or radiation exposure system configured to subject vulcanized rubber feedstock provided with at least one predetermined photoactive substance to rubber-penetrating radiation of first predetermined wavelength, the substance being configured, in response to exposure thereof to an external radiation of predetermined first wavelength, to initiate selective scission of molecular crosslinks, at least sulfur crosslinks, in the vulcanized rubber elastomers within the effective range thereof, and optional conveying means for transporting the rubber into and out of the radiation exposure system.

Dependent on the embodiment, the pre-processing means may comprise a number of devices for downsizing items made of cured (vulcanized) rubber by various methods, including, but not limited to cutting, slicing, shredding and grounding.

Dependent on the embodiment, the means for conveying the rubber may enable continuous (non-stop) or batch processes.

The utility of the various embodiments of the present invention follows from a plurality of issues. The present invention enables relatively simple and rapid devulcanization of vulcanized rubber feedstock with good yield. The process parameters, including the emission wavelength, may be cleverly tuned by means of adjusting dimensions (size), shape and composition of the associated nanoparticles such as quantum dots. This fact allows attaining high selectivity in cleaving intra- and/or intermolecular bonds. Hence, sulfur crosslinks can be selectively cleaved without causing excessive damage to main chains of the molecular backbone, i.e. carbon-carbon bonds will be preserved. The method does not involve extensive utilization of harsh chemical agents and/or extreme temperatures. Non-toxic substances including photoactive substances may be utilized.

Addition of the photoactive substance(s) and optionally of further additives to rubber feedstock blend(s) may be implemented during the manufacturing of the associated rubber product, i.e. prior to or upon vulcanization. The manufactured rubber product, such as a vehicle tyre, may thus incorporate the photoactive substance(s) during the whole lifespan of said product. Alternatively aforesaid substance may be added to rubber blend(s) just prior to or during the devulcanization process. The first approach provides means for automotive manufacturers to integrate plants for recycling of used vulcanized rubber directly within the manufacturing facility. Also a hybrid approach with multi-stage insertion of photoactive substance(s) is applicable.

The method and the related arrangement allow efficient processing of almost any kind of vulcanized rubber including, but not limited to the rubber selected from the group consisting of natural rubber and synthetic rubber, such as butadiene rubber, polyethylene rubber, (poly)isoprene rubber, butyl rubber, ethylene-propylene rubber, ethylene-butene rubber, styrene-butadiene rubber, chloroprene rubber, nitrile rubber, acrylic rubber, ethylene-propylene diene rubber, and mixtures thereof. Thus, reclaiming of vulcanized rubber, as well as recycling various rubber products, such as car- or generally vehicle tyres, conveyor belts, pipes, tubes and the like, may be made both technically and economically feasible through the utilization of the present invention.

The term "wavelength" may generally refer herein to a certain wavelength or certain range of wavelengths, unless particularly specified.

The term "elastomer" refers herein to indicate an elastic polymer, having sufficiently long and flexible crosslinks between adjacent polymeric chains to allow movement of said chains in relation to each other.

The term "sulfur crosslink(s)" is used in this disclosure largely to indicate sulfur bond(s) created upon vulcanization process and bridging adjacent polymeric chains together, such as —S—, —S—S—, and —$S_x$—, wherein x>1.

The term "intermolecular crosslink(s)" is used in this disclosure largely to indicate crosslink(s) forming between individual polymer molecules upon rubber vulcanization process.

The expression "rubber blend" may be applied equally well to cured (vulcanized; sulfur cross-linked) and uncured (devulcanized; sulfur cross-links are broken) rubber feedstock.

The expression "a number of" refers herein to any positive integer starting from one (1), e.g. to one, two, or three.

The expression "a plurality of" refers herein to any positive integer starting from two (2), e.g. to two, three, or four.

The terms "a" and "an", as used herein, are defined as one or more than one.

The terms "first" and "second" are used herein to distinguish an element from other element and not to denote any particular priority in order if not otherwise explicitly indicated.

Different embodiments of the present invention will become apparent by consideration of the detailed description and accompanying drawings.

BRIEF DESCRIPTION OF THE RELATED DRAWINGS

Next the invention is described in more detail with reference to the appended drawings in which.

DETAILED DESCRIPTION OF THE EMBODIMENTS

A procedure for the devulcanization of e.g. discarded items made of cured (vulcanized) rubber is provided herein. The method largely utilizes the presented concept of photon-activated molecular degradation mediated by photoactive substance(s), wherein the photoactive substance is introduced directly into polymeric blend.

Photoactive substance is preferably provided as an inorganic or organic compound or a complex of compounds capable of acquiring an activated state upon photon capture and to initiate selective breakdown of intermolecular crosslinks in the vulcanized rubber elastomers.

Figure 1:
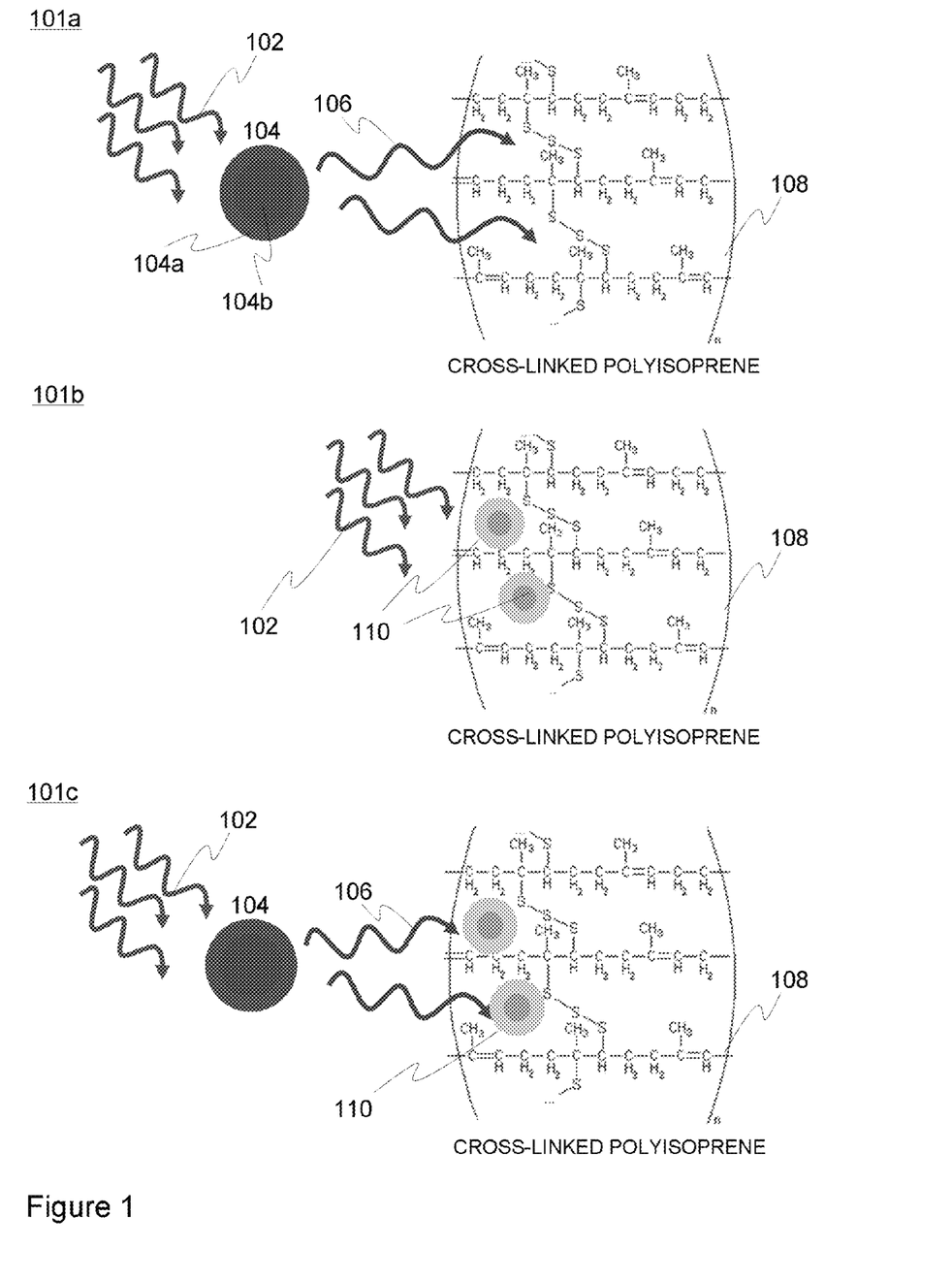
FIG. 1 illustrates few basic concepts underlying various embodiments of the present invention.

FIG. 1 illustrates few basic concepts underlying the various embodiments of the present invention.

In one embodiment, photoactive substance may thus be configured to mediate photon excitation—emission processes, wherein the excitation (activation) of said photoactive substance by external radiation induces emission radiation, which, in turn, initiates dissociation and/or modification processes in cross-linked polymers.

101a schematically depicts such embodiment and an effect thereof on vulcanized rubber polymer represented herein by sulfur cross-linked polyisoprene 108, indicative of a functional target of the photoactive substance, such as sulfur crosslinks. The photoactive substance, denoted by reference numeral 104, is disposed to polymeric rubber blends(s). Amount of substance 104 may be experimentally adjusted, for instance, to an extent sufficient to ensure allocation thereof essentially in the vicinity of the target bonds, such as sulfur crosslinks.

One of the preferable photoactive substances may be provided in the form of semiconductor nanocrystals, in particular so called Quantum Dots (QDs). QDs are luminescent inorganic nanoparticles of semiconducting material with diameters in the range of e.g. 1-10 nm, whose electronic characteristics are closely related to the size and shape of the individual particle (crystal); therefore excitation and emission of QDs are highly tunable so that crystals of same chemical composition may have emission maxima in a wide range. Preferably, the utilized quantum dots are substantially non-toxic.

The present invention generally enables utilization of various QDs, provided as core-type (single component) or core-shell (multicomponent) quantum dots, and composed of chalcogenides (selenides, sulfides and tellurides) and oxides of metals belonging to groups II-V of the Periodic Table. Metallic component may be preferably selected from the group consisting of zinc (Zn), cadmium (Cd), mercury (Hg), indium (In), aluminium (Al), tungsten (W), lead (Pb), antimony (Sb) and bismuth (Bi). Furthermore, QDs may be doped with metal ions (e.g. magnesium, manganese, copper, silver etc.).

Furthermore, so-called alloyed QDs may be utilized, which allow tuning optical and electronic properties thereof by changing the composition and internal structure thereof without changing crystal size. Exemplary alloyed QDs may include quantum dots of tunable compositions, such as e.g. $CdS_xSe_{1-x}/ZnS$, commercially available from Sigma-Aldrich™, for example.

For the purposes of present invention, quantum dots, comprising at least one of the cadmium (Cd), zink (Zn) or selenium (Se) are preferably utilized. Still preferably, multicomponent QDs, such as ZnSe/ZnS (or CdSe/ZnS) or ZnCdSe/ZnS are utilized. Hydrophobic quantum dots ZnCdSe/ZnS have an emission peak at 440 nm; whereas hydrophobic ZnSe/ZnS QDs can be tuned to have emission maxima in the region between 390 and 450 nm.

Yet, the applied QDs may in particular include thulium (Tm), gadolinium (Gd), gallium (Ga), vanadium (V) and/or yttrium (Y). For instance, InGaN, YVO4:Tm or GdVO4:Tm could be utilized in the QD constitution.

QDs may be provided as colloid solutions. Utilization of solvent generally facilitates nanoparticle's drift within the polymer and proper positioning within the rubber matrix. Furthermore, utilization of solvent promotes swelling of the rubber dispersed therein upon vulcanization/devulcanization.

Depending on QD, chemical composition various solvents can be utilized, selected from the group consisting of, but not limited with hexane, heptane, toluene, chloroform, tetrahydrofuran, pyridine, alcohols and esters. For the purposes of present invention one preferred solvent is the aforementioned toluene.

It is characteristic to luminescent substances such as quantum dots 104 (at 101a) to emit photons 106 (i.e. emission radiation) upon excitation by external radiation 102. Since rather precise adjustment of emission wavelength is possible, it may be selected from a broad range of electromagnetic frequencies, including radiation that is visible or invisible to human eye, x-rays being one feasible example of the latter. The embodiment is, however, confined with the fact, that the emission wavelength should be suitable for initiating selective scission of the desired intermolecular crosslinks, such as sulfur crosslinks in the rubber elastomer 108. As mentioned above, the emission wavelength is typically dependent on the quantum dot size, shape and/or composition, thus enabling precise tailoring of the process, embodied herein at 101a, in terms of elastomer being processed, for example. The smaller the quantum dot is, the shorter emission radiation wavelength it generally produces, and vice versa. The quantum dots 104 may be provided in the form of a powder or a colloid solution, for example.

Quantum dots 104 of FIG. 1 are generally depicted as that of core-shell type, as disclosed above. Such QDs comprise a shell portion 104a and core portion 104b.

Portions 104a, 104b may be configured to provide different functionalities. For example, the shell 104a may be configured to attain best coordination into polymeric network, i.e. coordinate thereto, in terms of sulfur-sulfur bonds proximity. The core 104b may in turn be configured to exhibit luminescence (fluorescence) 106 of selected wavelength to cleave anticipated crosslinks, such as sulfur crosslinks, upon excitation by applicable external radiation 102.

Other appropriate embodiments of luminescent micro- and/or nanosized particles, such as e.g. colloid semiconducting nanoparticles, may be utilized as long as the general concept of the embodiment is fulfilled.

At 101b, one other embodiment is shown. Herein, the photoactive substance 110 is configured to mediate chemical processes resulting in selective breakdown/dissociation of intermolecular crosslinks, such as sulfur crosslinks, in the vulcanized rubber elastomers 108. Provision of the photoactive substance 110, referred herein as to "photochemical substance", is such that upon exposure to an external radiation 102 the substance 110 acquires capability to dissociate intermolecular crosslinks, such as sulfur crosslinks. Such dissociation may be either direct, when the substance 110 spontaneously transforms into the dissociation agent; or indirect, when the substance 110 generates the dissociation agent as a result of (photo)chemical reaction.

The photochemical substance 110 is preferably selected to break down (e.g. by reduction) S—S bonds, and, preferably also C—S bonds, but not carbon-carbon (C—C) bonds. Dissociation agent may thus be represented by various compounds, such as acids (e.g. carboxylic acid), bases and/or derivatives thereof. Photochemical substance 110, which will generate said dissociation agent upon irradiation, may be represented by e.g. aromatics that release organic acids upon irradiation, and/or by a reducing agent such as polymethylhydrosiloxane (PMHS).

In further supplementary embodiment, the rubber elastomer 108 may be embedded with photochemical substances 110 of different nature.

At 101c, a third embodiment is shown, provided herewith as one potential combination of two aforesaid embodiments. The rubber elastomer 108 is enriched with the first- and the second photoactive substances at once, wherein the first photoactive substance is the luminescent substance 104 and the second photoactive substance is the photochemical substance 110. The first and second substances may be selected from the ones disclosed above, for instance. Excitation of the luminescent substance 104 by the external radiation 102 generates emission 106. Emitted photons 106 affect, in turn, the photochemical substance 110 and trigger aforesaid (photo)chemical reaction(s) resulting in selective dissociation of molecular crosslinks, such as sulfur crosslinks. The external radiation 102 may be adjusted to emit at one or more wavelengths, in order to comply with sensitivity of the first and the second photoactive substances.

A skilled person shall realize that the embodiments described above may also be flexibly modified or combined to come up with new embodiment(s).

An external radiation 102 utilized in connection with many embodiments of the present invention is preferably represented by x-rays (e.g. from about 10 nm downwards). Alternatively or additionally, electromagnetic radiation of other range of frequencies (e.g. gamma rays, UV, etc.) may be exploited depending on the embodiment and especially e.g. the ability of the photoactive substances utilized therein to capture photons with characteristic wavelengths.

Figure 2:
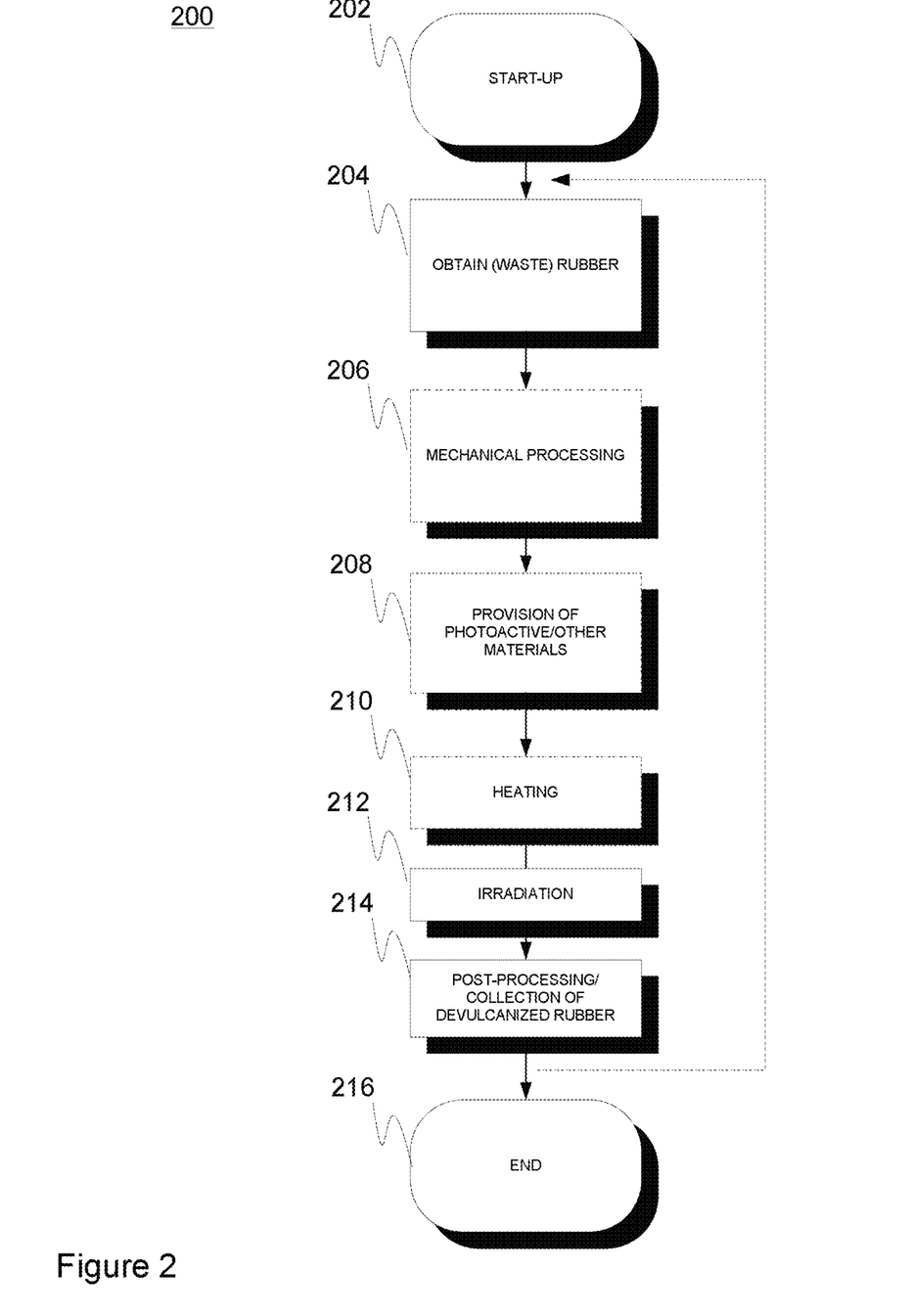
FIG. 2 is a flow chart disclosing an embodiment of a method in accordance with the present invention.

FIG. 2 is a flow chart, provided at 200, disclosing an embodiment of a method for devulcanizing cured rubber feedstock in accordance with the present invention.

Dotted rectangles represent generally optional method items. Dotted loop-back arrow depicts the potentially repetitive nature of the corresponding method items; the method may be executed as a batch type procedure, continuous procedure, or a preferred type of combination of both.

At method start-up 202, the necessary equipment, including that for pre-processing and irradiation stages, for instance, is obtained and configured in terms of e.g. proper process control parameters regarding the various subsystems belonging to the overall gear.

At 204, feedstock rubber such as vulcanized (scrap) rubber products, e.g. a plurality of vehicle tyres, is obtained. Said feedstock rubber products may be obtained as (already-) doped with photoactive substances, e.g. phosphor nanocrystals or dots, and/or the photoactive substances utilized in devulcanization may be provided to the rubber during the method execution as described herein.

At 206, the feedstock rubber is preferably pre-processed for the subsequent stages such that the rubber items obtained at 204 are typically downsized. At this stage the feedstock rubber may be mechanically processed by various methods, including, but not limited to cutting, slicing, shredding and grounding. Equipment utilized at this stage may include, among others, various extruders, mills, calendering machines and the like.

At 208, the photoactive substances (104, 110), solvents and other accessory agents, such as hydrogen producers, catalysts, modifiers and/or reducing agents may be provided and hydrogen atmosphere optionally created when needed. Said substances may be arranged into contact with the rubber feedstock material and potentially mixed therewith or be absorbed thereto.

At 210, the rubber feedstock may be heated up to the desired temperature such as vulcanization temperature, such as 150-180 degrees Celsius, preferably 160-170 degrees Celsius. Elevated to at least 100 degrees Celsius, the high temperature may be preserved throughout the whole process so as to facilitate devulcanization. Heating may, in practical circumstances, be executed in several subsequent phases to enable gradual temperature rise. In addition to, or potentially instead of, high temperature, elevated process pressure may be utilized.

At 212, pre-processed rubber feedstock is exposed to external radiation of at least one predetermined first wavelength so as to activate the photoactive substance(s) (104, 110) and initiate in said substances a direct and/or an indirect response reaction of selective scission of intermolecular crosslinks, such as sulfur crosslinks in the vulcanized rubber elastomers. Further, cooling may be required already during the irradiation and/or afterwards.

At 214, post-processing task(s) (e.g. cooling) and separation/collection of devulcanized rubber are performed.

At 216, the method execution is ended.

Regarding the distinct method items reviewed above, e.g. the execution order of items 206, 208, 210 may in some embodiments traversed if seen useful. In some embodiments, various method items such as any one or more of items 206-214 may be executed at least partially simultaneously, considering e.g. the extruder or mill device and its potential applicability in executing several aforementioned method items, whereupon their visualization as separate method items at 200 is mostly for clarity purposes.

The method as disclosed above may be advantageously utilized for the devulcanization of discarded (waste) vulcanized rubber vehicle tyres, such as car tyres, as well as for the devulcanization of other discarded vulcanized rubber products, such as various mats, belts or pipes.

For the purposes of the invention, it may be advantageous that the discarded vulcanized rubber products are doped with at least one photoactive substance already upon manufacturing thereof.

Figure 3:
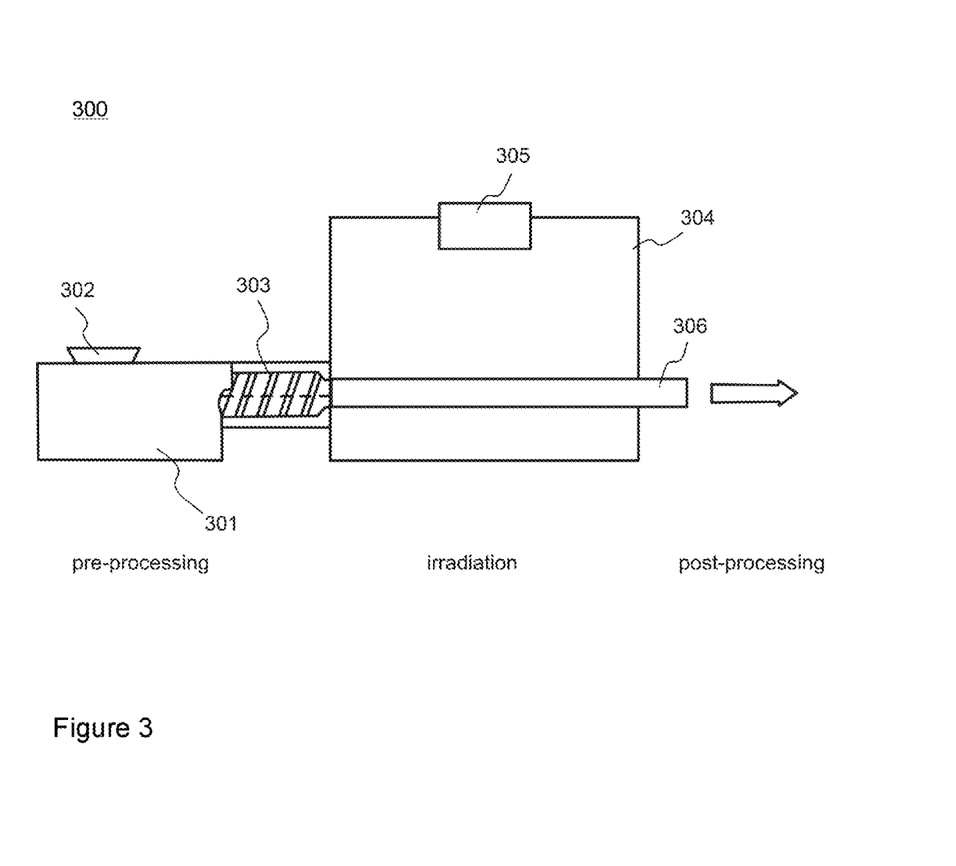
FIG. 3 is a high-level block diagram type illustration of one embodiment of an arrangement in accordance with the present invention.

FIG. 3 is a high-level block diagram type illustration of one exemplary embodiment of an arrangement in accordance with the present invention.

The arrangement 300 may be implemented in the form of a setup comprising necessary processing tools for executing the devulcanization procedure in accordance with the method 200.

The arrangement 300 may comprise a number of tools for pre-processing of vulcanized feedstock rubber, for irradiation thereof and for the post-processing of devulcanized material.

The pre-processing means may comprise e.g. a reactor chamber 301 to accommodate elements for downsizing rubber feedstock and/or for subjecting said rubber feedstock to mechanical stress. A reactor chamber 301 is preferably equipped with a feed hopper 302. Downsizing means are depicted in FIG. 3 in the form of an extruder; however, any other type of equipment providing sufficient mechanical stress to physically tear utilized rubber items can be utilized, including, but not limited to slicing, grinding, shredding or cutting equipment.

The extruder 303 may, in turn, be represented by a continuous or a batch-type extruder. Constructions, such as basin type reactors, are fully feasible depending on the process type (batch vs. continuous) and the nature of the material(s) to be processed. Extruders such as e.g. twin screw extruders with proper configuration may be exploited. Two screws may be, among other possible options, co-rotating or counter-rotating, intermeshing or non-intermeshing. Besides, internal configurations of the screws may be adapted for each use scenario regarding e.g. the conveying elements (forward/reverse), kneading blocks, etc. to obtain desired process features in terms of e.g. substance mixing. The reactor chamber 301 may additionally include a means for stretching the feedstock rubber, such as various rollers or calendering devices.

The arrangement 300 further comprises an irradiation system in the form of a radiation exposure block 304. Block 304 preferably comprises a radiation chamber. The block 304 can essentially vary in size dependent on the anticipated capacity of the devulcanization facility. The block 304 further comprises at least one radiation source 305, preferably implemented as an x-ray source. The block 304 may be implemented in connection with the extruder 303. The radiation chamber(s) may be at least partly formed therewithin, for example.

In some embodiments, the arrangement 300 may comprise a cooling means for cooling the materials in connection with irradiation chamber 304 and/or extruder 303. Alternatively or additionally, a cooling arrangement could be provided after the irradiation stage from the standpoint of the process pipeline.

The arrangement further preferably comprises a conveyor system 306 for conveying pre-processed feedstock from the reactor chamber 301 towards the radiation exposure block 304 and/or from the block 304—for further post-processing such as cooling and/or separation of devulcanized rubber. Said conveyor system may be realized as a single conveyor belt or, alternatively, as several separate conveyor belts connected therebetween by appropriate connecting means. Further, the extruder 303 may be inherently utilized as such a conveyor means. The conveyor system 306 may be connected with potential (intermediate) storage locations for devulcanized material. Conveying may further be realized in the form of a conveyor belt, chain or carriage connected with or ending at receptacle(s)/basin(s) for processed materials.

The arrangement 300 may comprise further elements, such as motor(s), gearbox/boxes, screws/other mechanical processing means, additional feed system(s), sensors and/or hydrogen producers. A feed system may be utilized for the addition of photoactive substances into the rubber feedstock. Optionally, a separate feed system may be implemented to lead auxiliary chemicals into the reactor chamber 301 and/or radiation exposure block 304 and add/mix said chemicals with the rubber feedstock.

In some embodiments, the arrangement 300 comprises temperature and/or pressure management system(s) comprising e.g. a number of heating elements and a number of temperature sensors, such as e.g. thermocouples, configured to elevate the temperature of cured feedstock rubber.

The arrangement 300 may be further equipped with a remote computer control system (not shown). Said control system preferably comprises means for monitoring and modifying process parameters, such as power of the irradiation source, wavelength, pressure and/or temperature, as well as speed of the conveyor belt, screw rotation and the like.

Depending on the embodiment, the arrangement 300 may be implemented to enable a continuous or a batch process. During continuous procedure vulcanized rubber feedstock is conveyed substantially non-stop through at least a number of process stages. During the batch type procedure a predetermined maximum amount of vulcanized rubber feedstock is processed at a time.

In some embodiments, the arrangement 300 may comprise post-processing tools/system, which may comprise, among others, various collectors, filters, separators and the like.

Various considerations presented herein concerning the embodiments of the method may be flexibly applied to the embodiments of the arrangement mutatis mutandis and vice versa, as being appreciated by a person skilled in the art.

The scope is defined by the appended claims.

The invention claimed is:

1. A method for devulcanization of rubber feedstock, comprising:
obtaining a vulcanized rubber feedstock provided with at least one predetermined photoactive substance, the substance comprising a scintillator or a luminescent substance configured to emit, in response to external radiation of a predetermined first wavelength, radiation of a second wavelength selected so as to initiate selective scission of intermolecular crosslinks in vulcanized rubber elastomers within an effective range thereof; and exposing the vulcanized rubber feedstock provided with said at least one photoactive substance to external, rubber-penetrating radiation of said first wavelength, said photoactive substance configured to emit, in response to said external radiation of first wavelength, radiation of a second wavelength selected so as to initiate a response reaction of selective scission of the intermolecular crosslinks in the vulcanized rubber elastomers, wherein the external radiation comprises or consists of x-rays.

2. The method of claim 1, wherein said at least one photoactive substance is provided in the form of scintillation nanocrystals configured as quantum dots.

3. The method of claim 2, wherein the nanocrystals are provided as core-type and/or core-shell quantum dots, and comprise chalcogenides and oxides of metals belonging to groups II-V of the Periodic Table, the metallic component being selected from the group consisting of: zinc, cadmium, mercury, indium, aluminium, tungsten, lead, antimony, and bismuth.

4. The method of claim 2, wherein the nanocrystals configured as quantum dots are further doped with metal ions.

5. The method of claim 2, wherein the nanocrystals comprise at least one material selected from the group consisting of: thulium, gadolinium, gallium, vanadium, and yttrium.

6. The method of claim 1, wherein the vulcanized rubber feedstock comprises discarded vulcanized rubber products.

7. The method of claim 1, further comprising a pre-processing stage, wherein the vulcanized rubber feedstock is subjected to mechanical stress, cutting, slicing, shredding or grounding.

8. The method of claim 1, implemented at temperatures within a range of about 150-180° C.

9. The method of claim 1, further comprising utilization of a solvent for swelling the rubber.

10. The method of claim 1, conducted in the presence of a reducing agent.

11. The method of claim 1, wherein the intermolecular crosslinks are sulfur crosslinks.

12. The method of claim 6, wherein said vulcanized rubber product is doped with the at least one predetermined photoactive substance already upon manufacturing of said rubber product.

13. The method of claim 1, wherein said at least one predetermined photoactive substance is mixed with or absorbed to the vulcanized rubber feedstock.

14. The method of claim 6, wherein discarded vulcanized rubber products comprise at least one of a vehicle tire, a conveyor belt, a mat, or a hosepipe.

15. The method of claim 8, implemented at levitated pressure.

* * * * *

UNITED STATES PATENT AND TRADEMARK OFFICE
CERTIFICATE OF CORRECTION

PATENT NO. : 9,120,907 B2  Page 1 of 1
APPLICATION NO. : 13/930423
DATED : September 1, 2015
INVENTOR(S) : Kalliopuska et al.

It is certified that error appears in the above-identified patent and that said Letters Patent is hereby corrected as shown below:

In the claims

Column 12, lines 25-26, claim 15 insert

--The method of claim 8, implemented at elevated pressure.--

Signed and Sealed this
Twenty-sixth Day of April, 2016

Michelle K. Lee
*Director of the United States Patent and Trademark Office*